(12) United States Patent
Kozak

(10) Patent No.: US 7,001,116 B2
(45) Date of Patent: Feb. 21, 2006

(54) WORKPIECE REMOVAL DEVICE FOR A HOLE SAW

(75) Inventor: Burton Kozak, Chicago, IL (US)

(73) Assignee: Eazypower Corporation, Chicago, IL (US)

( * ) Notice: Subject to any disclaimer, the term of this patent is extended or adjusted under 35 U.S.C. 154(b) by 258 days.

(21) Appl. No.: 10/402,687

(22) Filed: Mar. 29, 2003

(65) Prior Publication Data

US 2004/0191015 A1    Sep. 30, 2004

(51) Int. Cl.
*B23B 51/04* (2006.01)

(52) U.S. Cl. .......................... 408/68; 408/204
(58) Field of Classification Search ............... 408/204, 408/68, 206, 207, 209, 703, 226; 279/83
See application file for complete search history.

(56) References Cited

U.S. PATENT DOCUMENTS

| | | | | |
|---|---|---|---|---|
| 1,365,660 A | * | 1/1921 | Collier | 408/86 |
| 1,645,736 A | * | 10/1927 | Blanch et al. | 408/206 |
| 2,721,592 A | * | 10/1955 | Baker | 408/206 |
| 2,852,967 A | * | 9/1958 | Mueller et al. | 408/206 |
| 3,265,104 A | * | 8/1966 | Gallo, Sr. | 408/68 |
| 3,390,596 A | * | 7/1968 | Trevathan | 408/68 |
| 3,647,310 A | * | 3/1972 | Morse | 408/239 R |
| 3,648,508 A | * | 3/1972 | Hougen | 72/325 |
| 3,758,221 A | * | 9/1973 | Meshulam | 408/204 |
| 4,422,811 A | * | 12/1983 | Ellison et al. | 408/204 |
| 5,035,548 A | * | 7/1991 | Pidgeon | 408/68 |
| 5,934,845 A | * | 8/1999 | Frey | 408/68 |

FOREIGN PATENT DOCUMENTS

| | | | | |
|---|---|---|---|---|
| AU | 234301 | * | 6/1961 | 408/204 |
| FR | 904860 | * | 11/1945 | 408/204 |
| FR | 2668405 | * | 4/1992 | |
| JP | 57-163006 | * | 10/1982 | 408/204 |
| JP | 2003-145330 | * | 5/2003 | |
| NL | 63762 | * | 7/1949 | 408/204 |
| SU | 271781 | * | 9/1970 | 408/204 |

* cited by examiner

*Primary Examiner*—Daniel W. Howell
(74) *Attorney, Agent, or Firm*—Cherskov & Flaynik

(57) ABSTRACT

A workpiece removal device 10 for a hole saw 8 includes a positioning member 12 joined to the hole saw 8, a first securing member 14 joined to the positioning member 12, a biasing member 16 having a first end 18 joined to the first securing member 14; a second securing member 20 joined to a second end 22 of the biasing member 16; and disposing the second securing member 20 in communication with a workpiece whereby a preselected portion of the workpiece is ultimately severed from the workpiece by the hole saw, whereupon, the biasing member forcibly removes the severed preselected portion of the workpiece from the hole saw.

33 Claims, 13 Drawing Sheets

WORKPIECE REMOVAL DEVICE FOR A HOLE SAW

BACKGROUND OF THE INVENTION

1. Field of the Invention

The present invention relates to hole saws and more particularly, to a workpiece removal device for a hole saw.

2. Background of the Prior Art

Hole saws are commonly used to cut out annular portions from a workpiece. The workpiece may include wood, drywall, plaster and cylinder blocks. The annular cut out portion may be utilized for piping, electrical conduit or access portals to wiring and control equipment. The hole saw includes a drill bit that penetrates a workpiece to stabilize the hole saw assembly, including a rotary drive tool, as a cutting portion of the hole saw engages the workpiece. The cutting portion ultimately severs a predetermined portion of the workpiece thereby providing an aperture after the cutting portion and the severed portion "stuck" in an internal cavity of the hole saw, is extracted from the workpiece.

The problem with prior art hole saws is that the severed portion inside the hole saw can be difficult to remove. In some instances, a person needs to forcibly pry the severed portion from the hole saw with a screwdriver or similar rigid tool. Whatever the technique utilized to remove the severed portion, an excessive loss of time and money result from the user having to wrestle with the manual removal of the severed portion from the hole saw cavity.

A need exists for a device that can "eject" the severed portion from the hole saw without requiring manual assistance.

SUMMARY OF THE INVENTION

It is an object of the present invention to overcome many of the disadvantages associated with hole saws.

A principle object of the present invention is to provide a workpiece removal device for a hole saw. A feature of the device is that it is detachably secured to the hole saw. An advantage of the device is that larger or smaller sized devices may be utilized with a particular hole saw to enable the hole saw to cut a myriad of workpiece materials with varying thicknesses.

Another object of the present invention is to provide a workpiece removal device that removes a severed portion of the workpiece from a cavity in the hole saw. A feature of the device is a biasing spring that has a secured first end and a "free" second end that promotes axial movement of the spring relative to a drill portion of the device. An advantage of the device is that the spring forcibly removes the severed workpiece portion from the hole saw without manual assistance.

Yet another object of the present invention is to direct a spring biasing force perpendicular to a preselected portion of a workpiece. A feature of the device is the integral joining of the first and second securing members with corresponding ends of the biasing spring, the securing members each having an aperture through a central portion thereby forming a "spool" configuration when opposing ends of the biasing spring are joined to the securing members. An advantage of the device is that the relative position of the spring can be maintained while the spring is compressed during the cutting of the predetermined portion of the workpiece. Another advantage of the device is that the relative position of the spring can be maintained when the spring expands and forcibly removes the cut portion of the workpiece from the internal cavity of the hole saw.

Another object of the present invention is to maintain the assembled spring and securing members upon the drill bit. A feature of the device is a drill bit having a longitudinal dimension greater than the axial dimension of the spring and securing members. An advantage of the device is that the spring and securing members do not have to be axially realigned with the drill bit after the severed portion of the workpiece has been removed from the hole saw. Another advantage of the device is that the spring does not engage the drill bit during operation of the hole saw.

Still another object of the present invention is to stabilize the device, drill bit and the cutting portion of the hole saw. A feature of the device is a threaded portion of the drill bit that removably receives a locking nut which ultimately secures the drill bit to the hole saw. Another feature of the device is a longitudinal dimension that disposes a second securing member upon the drill bit such that the second securing member and a cutting portion of the hole saw engage a workpiece substantially simultaneously. Another feature of the device is a drill bit having a substantially longer axial dimension than the axial dimensions of either the biasing spring or hole saw. An advantage of the device is that the axial positions of the drill bit, hole saw and biasing spring relative to the workpiece are substantially maintained during the cutting operation thereby providing an aperture with axis perpendicular to the surface of the workpiece. Another advantage of the device is that the drill bit axially guides the hole saw into engagement with the workpiece.

Another object of the present invention is to provide a replaceable drill bit. A feature of the device is a set screw that ultimately engages a stem portion of the drill bit via an aperture in a locking member. Another feature of the device is a drill bit with a threaded stem portion that is inserted into a threaded recess in the locking member. An advantage of the device is that drill bits of varying diameters may be utilized to engage the workpiece. Another advantage of the device is that the drill bit may be replaced after becoming "dull" due to excessive use.

Another object of the present invention is to provide a replaceable biasing spring. A feature of the device are first and second securing members that are joined to the biasing spring, but that are allowed to slide upon the surface of the drill bit via central orifices. An advantage of the device is that the biasing spring need only be replaced rather than the entire hole saw assembly when workpieces of varying fabrication materials are cut. Another advantage of the device is that the biasing spring is easily replaced after becoming fatigued due to excessive use.

Another object of the present invention is to provide a device that prevents friction between a second securing member and a workpiece. A feature of the device are multiple ball bearing that are disposed between inner and outer raceways of the second securing member. An advantage of the device is that the outer raceway remains stationary upon engaging the surface of the workpiece thereby avoiding excessive heat generation that could damage the device when the hole saw penetrates a workpiece.

Another object of the present invention is to provide a device that maintains a cut portion of a workpiece within a cavity in the hole saw. A feature of the device is a hole saw having an axial dimension slight shorter than the axial dimension of a drill bit, and relatively longer than the axial dimension of the combined biasing spring and securing members. An advantage of the device is that a severed portion of the workpiece remains partially in the hole saw after removing the hole saw from the workpiece thereby preventing the severed portion from slipping off the drill bit and remaining inside the workpiece.

Briefly, the invention provides a workpiece removal device for a hole saw comprising a positioning member joined to the hole saw; a first securing member integrally joined to said positioning member; a biasing member having a first end integrally joined to said first securing member; a second securing member integrally joined to a second end of said biasing member; and means for disposing a predetermined portion of said second securing member in communication with a workpiece whereby a preselected portion of the workpiece is ultimately severed from the workpiece by the hole saw, whereupon, said biasing means forcibly removes the severed preselected portion of the workpiece from the hole saw.

BRIEF DESCRIPTION OF THE DRAWINGS

These and other objects, advantages and novel features of the present invention, as well as details of an illustrative embodiment thereof, will be more fully understood from the following detailed description and attached drawings, wherein.

DETAILED DESCRIPTION OF THE PREFERRED EMBODIMENT

Figure 1:
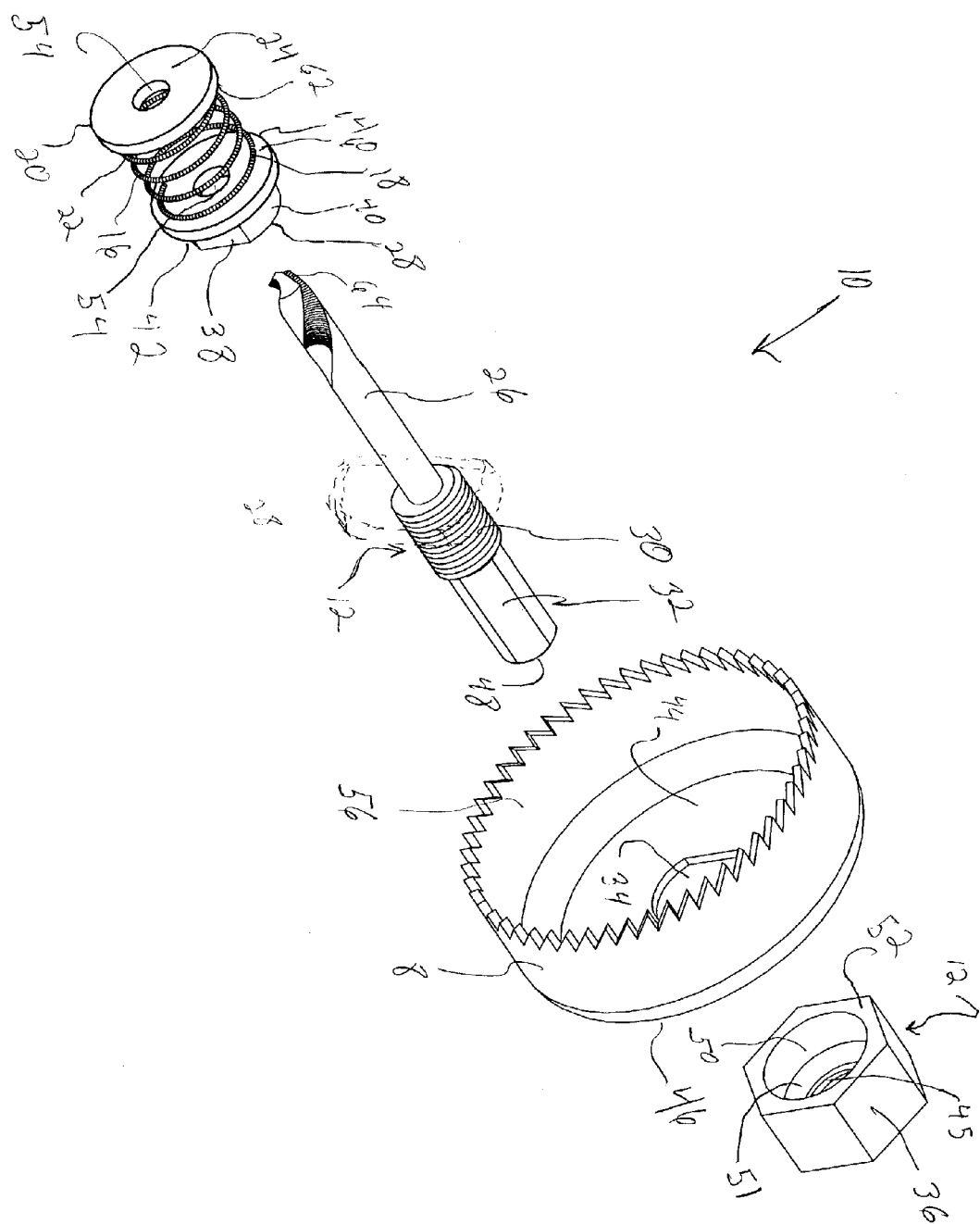
FIG. 1 is an exploded perspective view of a workpiece removal device for a hole saw in accordance with the present invention.
Figure 2:
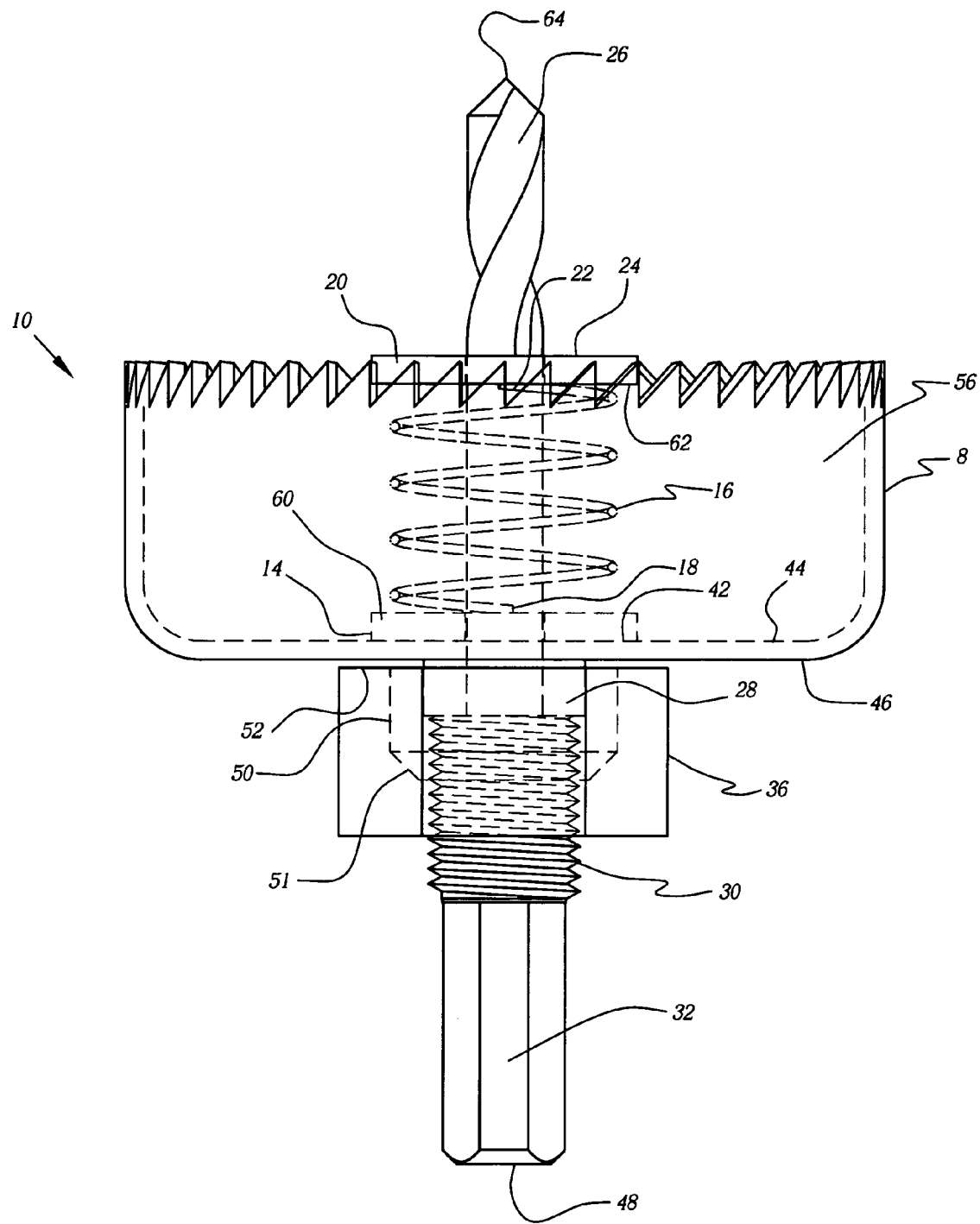
FIG. 2 is a side elevation view of the device secured to a hole saw, the device includes a biasing spring in a non-biased position.
Figure 3:
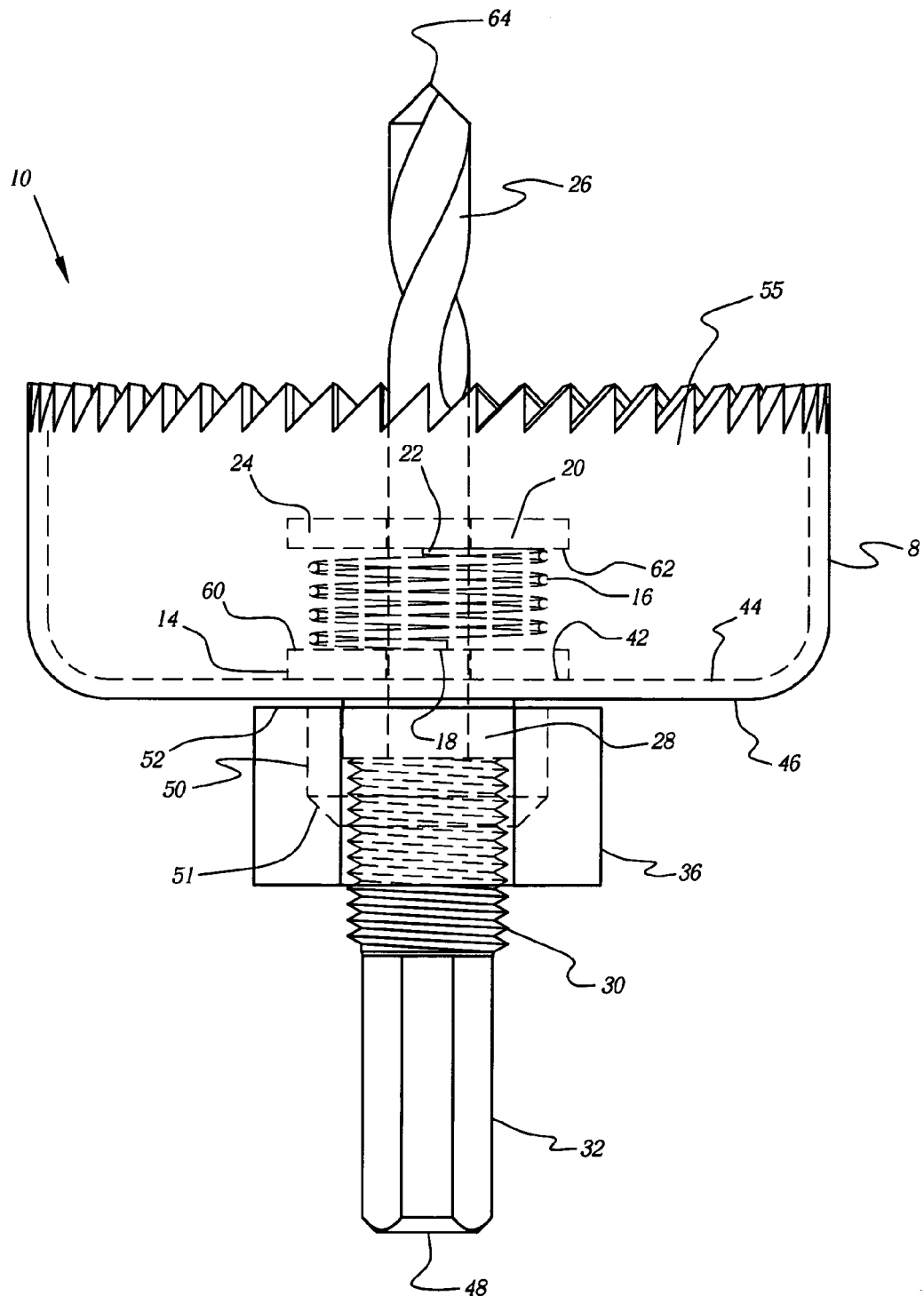
FIG. 3 is a side elevation view of the device and hole saw of FIG. 2 except that the biasing spring is in a biased position.

Referring now to FIGS. 1, 2 and 3, a workpiece removal device for a hole saw 8 (not part of the invention) is denoted by numeral 10. The device 10 is fabricated from metal with carbon steel being the material of choice. The device 10 includes a positioning member 12 that is detachably joined to the hole saw 8, a first securing member 14 integrally joined (via welding or similar methods) to the positioning member 12, a biasing member or spring 16 having a first end 18 integrally joined to the first securing member 14, and a second securing member 20 integrally joined to a second end 22 of the spring 16. An outer wall 24 of the second securing member 20 is ultimately disposed to communicate (irrespective of the orientation of the hole saw 8) with a preselected portion of the workpiece to promote the severance of the preselected portion from the workpiece by the hole saw 8. As the hole saw 8 cuts deeper into the workpiece, the spring 16 is increasingly compressed until the hole saw 8 severs the preselected portion, whereupon, the spring 16 expands to forcibly remove the severed preselected portion of the workpiece from the hole saw 8.

The positioning member 12 includes a drill bit 26 integrally joined to a locking member 28 with a threaded end portion 30. The threaded end portion 30 of the locking member 28 is integrally joined to a shank portion 32. The locking member 28 is configured to snugly insert through an aperture 34 in the hole saw 8 whereby the position of the positioning member 12 is secured relative to the hole saw 8 upon the threaded joining of a locking nut 36 to the threaded end portion 30. The shank portion 32 is removably secured to a rotary motion tool (not depicted) thereby providing rotational force to the drill bit 26. The drill bit 26 has a typical configuration and is dimensioned to penetrate, when rotated, the workpiece sufficiently to guide and stabilize the second securing member 20 and hole saw 8 upon engaging the workpiece thereby promoting the severing of a preselected portion 66 of the workpiece until the hole saw 8 is removed from the workpiece.

The locking member 28 is substantially a standard threaded hex nut with the exception that the external wall configuration has been modified to include two opposing planar walls 38 and two opposing arcuate walls 40 that snugly insert through a corresponding configuration of the aperture 34 in the hole saw 8 thereby promoting the transfer of rotary motion from the positioning member 12 to the hole saw 8 while reducing wear between engaging portions of the locking member 28 and the hole saw 8 when the forceful transfer of rotary motion occurs. The threaded end portion 30 is integrally joined to the locking member 28 via welding or similar methods. The threaded end portion 30 includes typical NPT type outer threads having an outer diameter that facilitates the relatively snug passage of the end portion 30 through the aperture 34 in the hole saw 8. The end portion 30 and the locking member 28 are ultimately inserted through the aperture 34 until an outer planar wall 42 of the first securing member 14 engages an inner planar wall 44 of the hole saw 8.

The shank portion 32 of the positioning member 12 has a typical hexagonal configuration for insertion into a standard chuck portion of a rotary drive tool. The shank portion 32 is dimensioned to cooperate with the longitudinal and diameter dimensions of the threaded end portion 30 to allow the locking nut 36 to snugly slide upon the shank portion 32 until the internal threads 45 of the locking nut 36 engage the outer threads of the end portion 30, whereupon, the locking nut 36 is tightened until forcibly engaging an outer planar wall 46 of the hole saw 8. The tightened locking nut 36 results with the threaded end portion 30 extending longitudinally through the nut 36 to dispose the shank portion 32 for insertion into the chuck portion of the rotary drive tool. The shank portion 32 has a longitudinal dimension that facilitates a slight separation between the threaded end portion 30 and the chuck portion of the rotary drive tool after an end wall 48 of the shank portion 32 engages a corresponding inner wall of the chuck portion.

The locking nut 36 has an internal configuration that includes a cavity 50 that snugly captures the locking member 28 protruding through the hole saw 8 as the threaded end portion 30 engages the internal threads 45 of the nut 36. The cavity 50 includes a conical reducing portion 51 that joins with the internal threads 45 to "funnel" the end portion 30 into threaded engagement with the internal threads 45. The configuration of the locking nut 36 promotes the threaded joining of the locking nut 36 with the end portion 30 such that an inner end wall 52 of the nut 36 forcibly engages the outer planar wall 46 of the hole saw 8 thereby rigidly securing the positioning member 12 to the hole saw 8.

The first and second securing members 14 and 20 include standard washers having central apertures 54 that snugly receive cooperating portions of the positioning member 12 therethrough. The diameters of the securing members 14 and 20 are relatively larger than the diameter of the spring 16 to facilitate a stable joining of the securing members 14 and 20 with the spring 16. The spring 16 is fabricated from metal and has sufficient expansion force, after being compressed, to forcibly remove a severed portion of a workpiece from an internal cavity 56 of a hole saw 8. A suitable spring 16 is manufactured by Prime-Line Products Company in San Bernardino, Calif. The part number of the spring 16 is SP-9709.

In operation, a hole saw 8 is selected to circularly cut a predetermined portion of a workpiece. Based upon the size of the predetermined portion and the fabrication material for the workpiece, a device 10 is selected to guide the hole saw to ultimately engage and cut the workpiece, and to remove the cut portion of the workpiece from the internal cavity 56 of the hole saw 8 after the predetermined portion 66 has been completely severed from the workpiece. The device 10 is assembled and secured to the hole saw 8 by inserting a shank portion 32 of a positioning member 12 of the device 10 through an aperture 34 in a central portion of the hole saw 8 such that an outer wall 42 of a first securing member 14 engages an inner wall 44 of the hole saw 8, whereupon, a locking nut 36 is threaded onto a threaded end portion 30 of a locking member 28. The locking nut 36 is tightened upon the threaded end portion 30 until the inner end wall 52 of the nut 36 forcibly engages an outer wall 46 of the hole saw 8 thereby rigidly securing the device 10 to the hole saw 8.

The outer wall 42 of the first securing member 14 is integrally joined to an outer wall 58 (see FIG. 1B) of the locking member 28; a spring 16 having already been secured to inner walls 60 and 62 of first and second members 14 and 20 thereby securing and axially aligning the spring 16 and securing members 14 and 20 to a drill bit 26 which is integrally joined to a central portion of the securing member 28. The securing members 14 and 20, and the spring 16 are configured to allow the securing members 14 and 20 to snugly slide upon the periphery of the drill bit 26, while the spring 16 is suspended circumferentially about the bit 26 and between the securing members 14 and 20 such that the spring 16 does not engage the bit 26 at any time, irrespective of a compressed or extended disposition as depicted in FIGS. 2 and 3.

Figure 4:
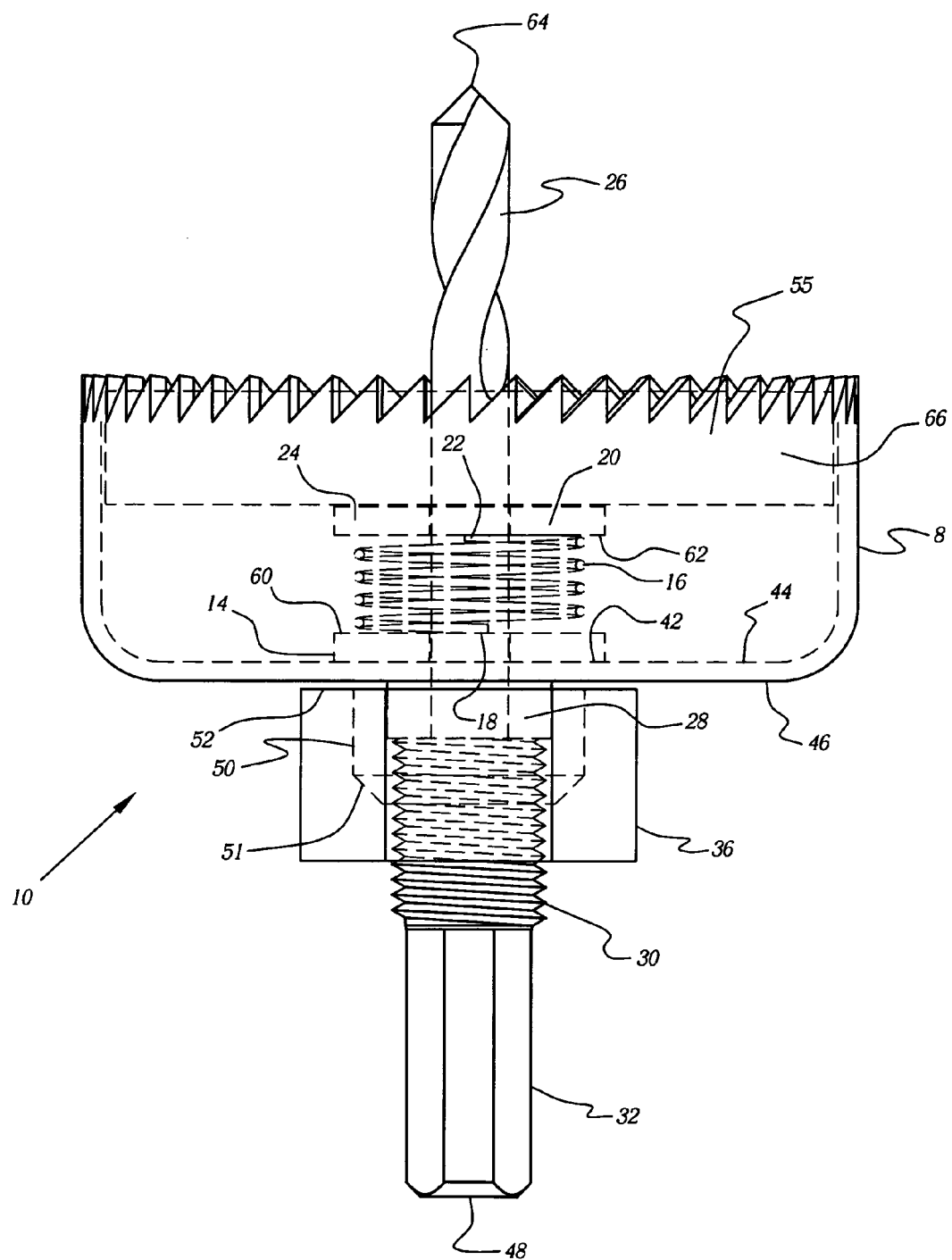
FIG. 4 is a side elevation view of the device and hole saw of FIG. 3 except that a severed portion of a workpiece is inside the hole saw compressing the biasing spring.
Figure 5:
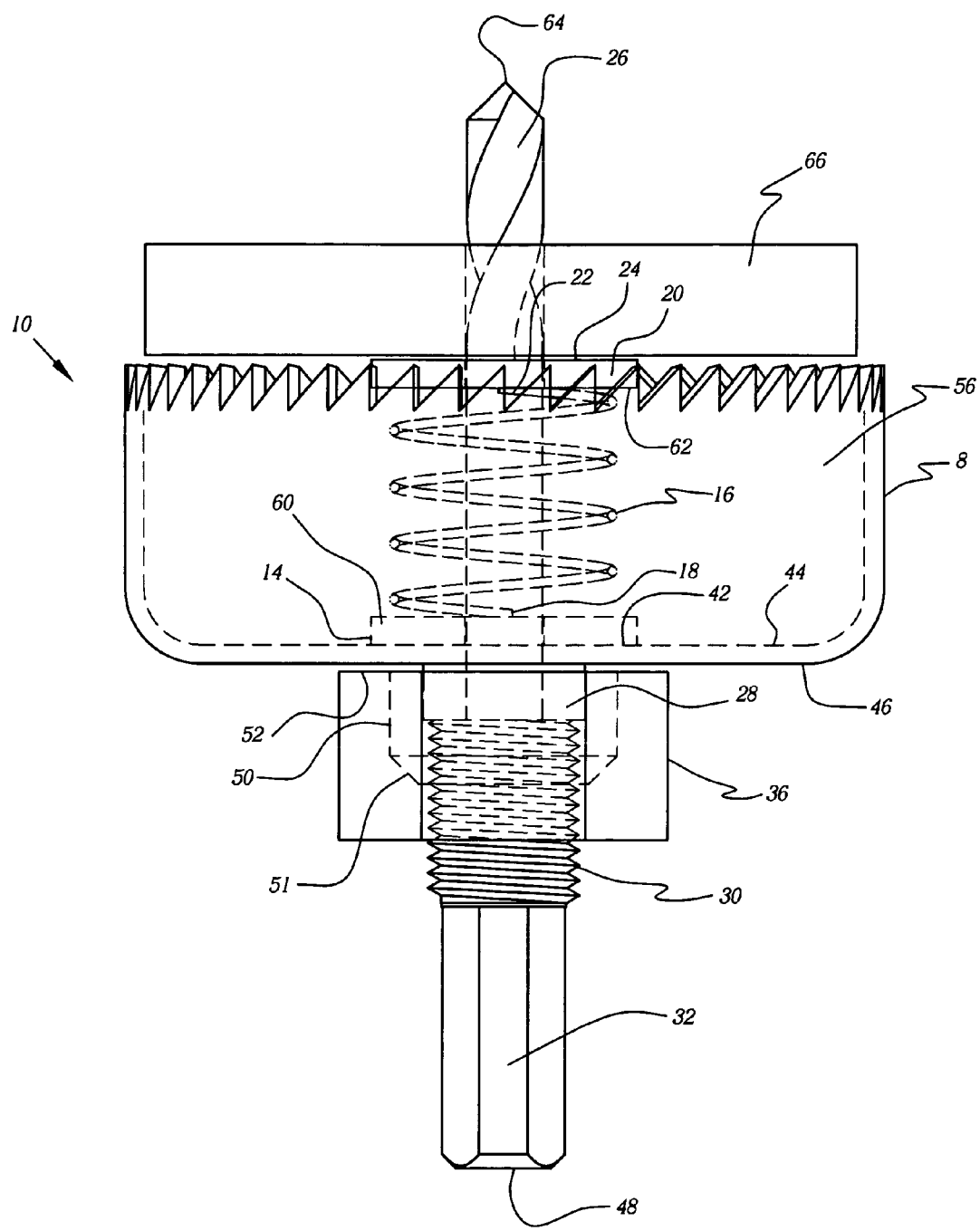
FIG. 5 is a side elevation view of the device and hole saw of FIG. 4 except that the severed portion of the workpiece is depicted removed from the hole saw by the biasing spring expanding to its non-biased position.

After securing the device 10 to the hole saw 8, the shank portion 32 is removably inserted into a rotary power tool. A tip portion 64 of the drill bit 26 is centrally positioned upon the predetermined portion of the workpiece that is to be cut by the hole saw 8. The rotary power tool is then energized to forcibly drive the drill bit 26 into the workpiece until the hole saw 8 engages the predetermined portion of the workpiece to be cut and removed. The drill bit 26 and the hole saw 8 both continue to penetrate until the hole saw 8 completely severs the predetermined portion from the workpiece resulting in the compression of the spring 16 and the disposition of a severed workpiece portion 66 into the internal cavity 56 of the hole saw 8 as depicted in FIG. 4. The hole saw 8 is then manually separated from the workpiece resulting in the spring 16 expanding to forcibly remove the severed workpiece portion 66 from the internal cavity 56 of the hole saw 8 as depicted in FIG. 5, whereupon, the severed portion of the workpiece is manually slid from the drill bit 26 thereby allowing the hole saw to cut another annular opening into the workpiece.

Figure 1A:
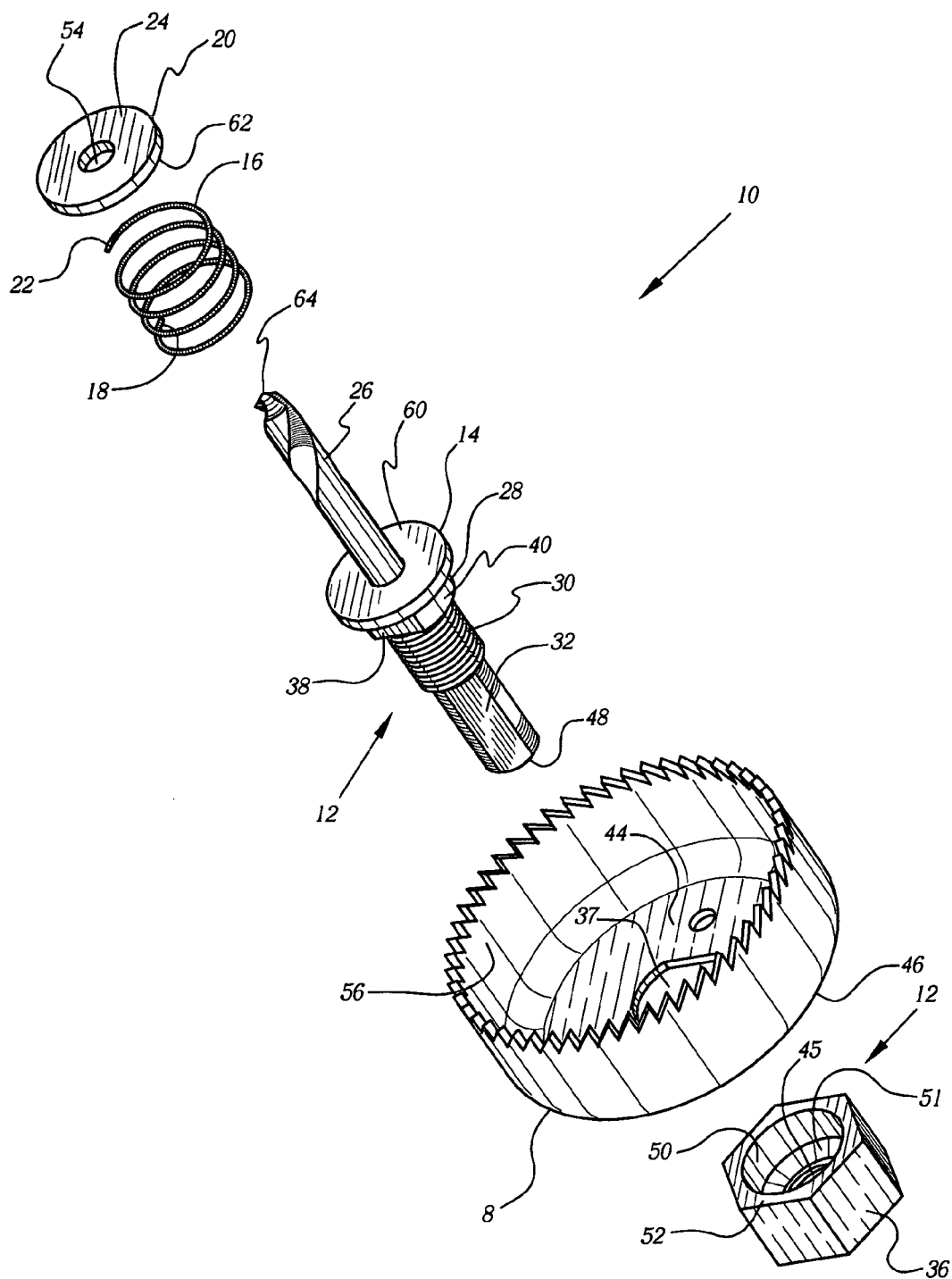
FIG. 1A is an exploded perspective view of a modification of the device of FIG. 1 in accordance with the present invention.
Figure 1B:
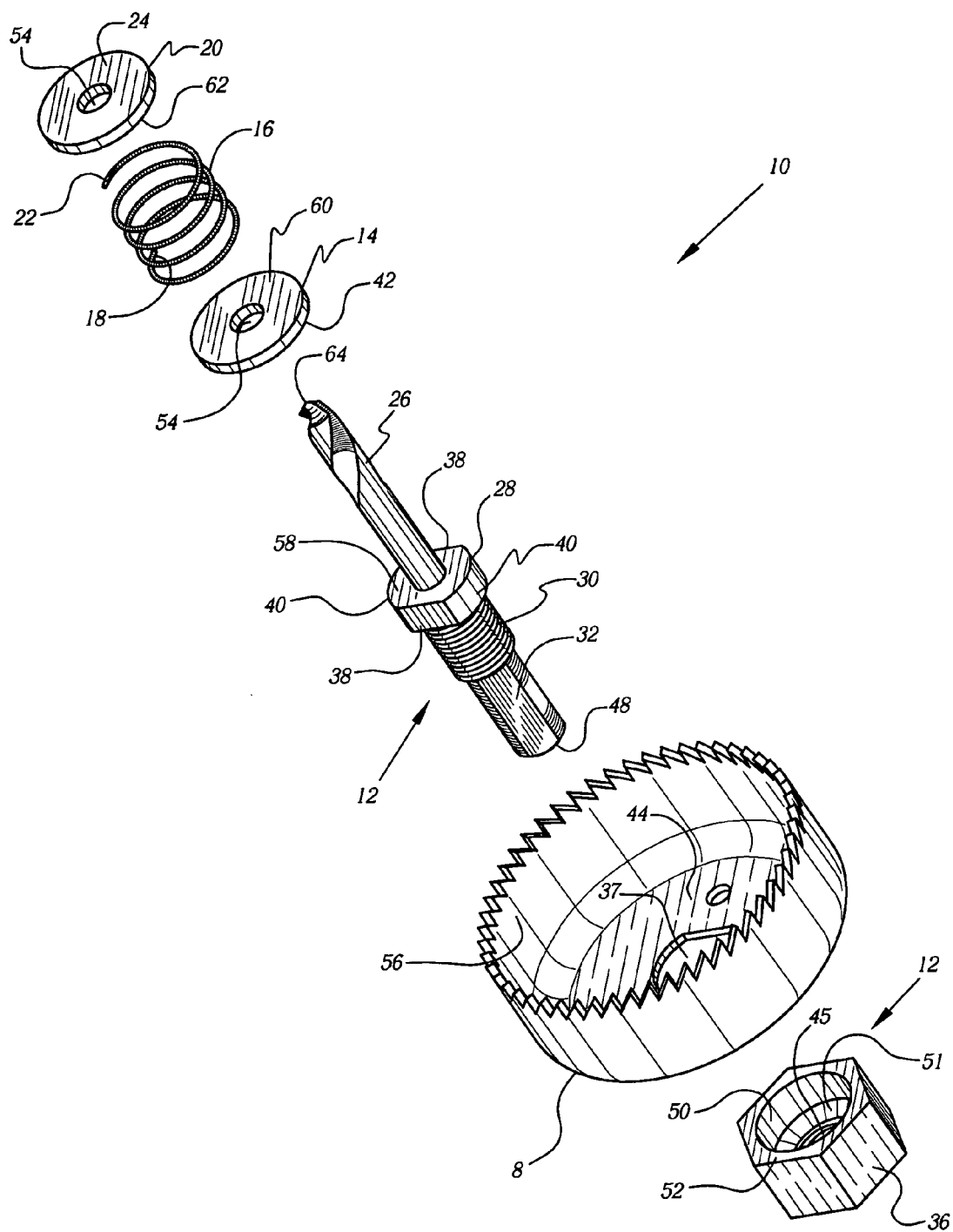
FIG. 1B is an exploded perspective view of another modification of the device of FIG. 1 in accordance with the present invention.

Referring now to FIGS. 1A and 1B, exploded perspective views of modifications of the device of FIG. 1 in accordance with the present invention are depicted. The modification of figure IA is the uncoupling of the second member 20 from the second end 22 of the spring 16. The second member 20 is allowed to "float" upon the spring 16 thereby transferring significant friction and heat from the contacting surfaces of the second member 20 and the workpiece to contacting portions of the second member 20 and the spring 16. The first end 18 of the spring 16 remains joined to the inner wall 60 of the first member 14 for the device 10 of FIGS. 1 and 1A.

The modification of FIG. 1B is the uncoupling of the second member 20 from the second end 22 of the spring 16, and the uncoupling of the first member 14 from the locking member 28. The first end 18 of the spring 16 remains joined to the inner wall 60 of the first member 14. The modification of FIG. 1B transfers significant friction and heat from the contacting surfaces of the second member 20 and the workpiece (FIG. 1) to contacting portions of the second member 20 and the spring 16, and contacting portions of the first member 14 and the locking member 28. The modification of FIG. 1B distributes the friction and heat between the workpiece, the spring 16, the first and second securing members 14 and 20, and the locking member 28 thereby reducing the possibility of damaging any component of the device 10.

Figure 6:
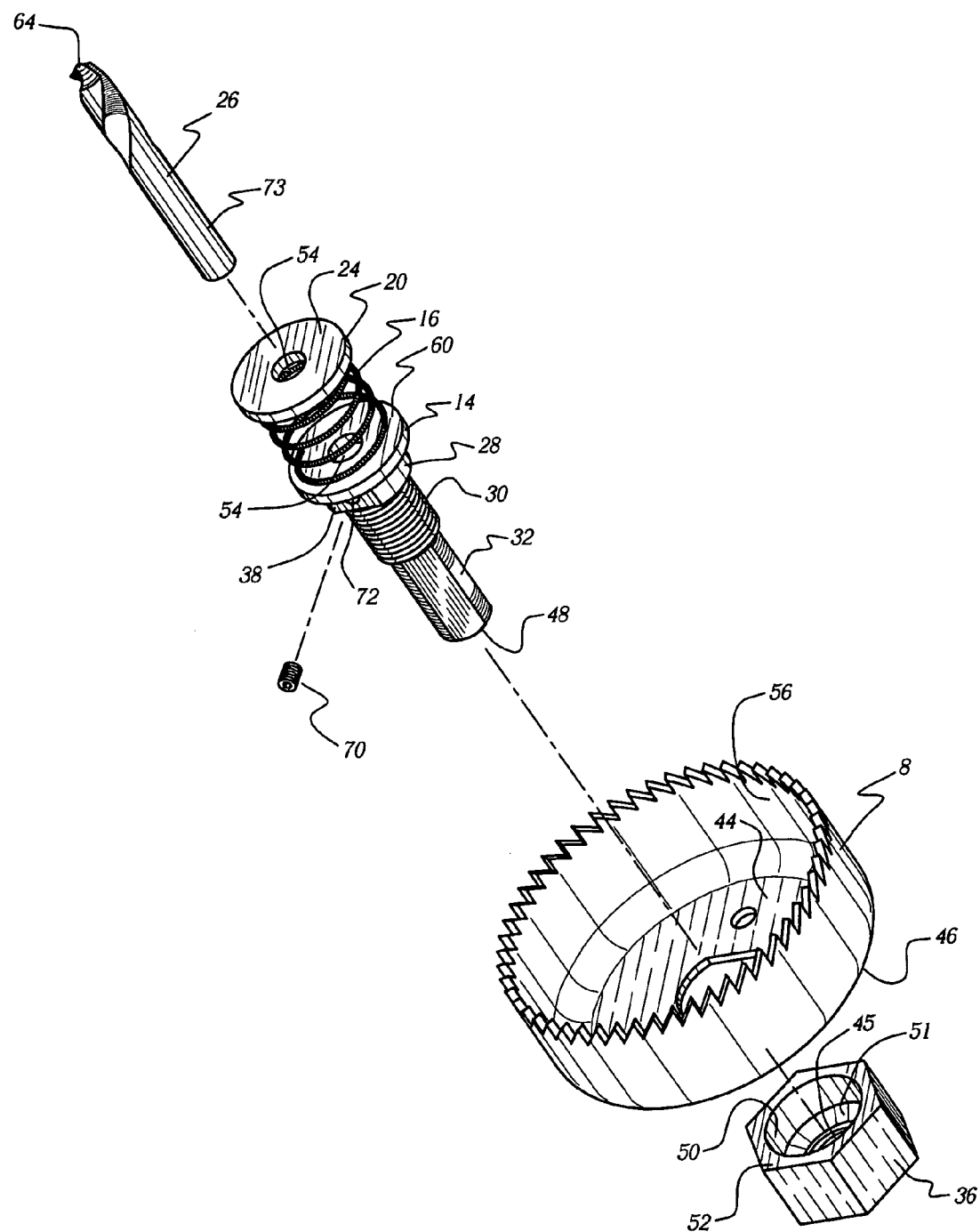
FIG. 6 is an exploded perspective view of an alternative design for the device of FIG. 1 in accordance with the present invention.

Referring now to FIG. 6, an exploded perspective view of an alternative design for the device of FIG. 1 in accordance with the present invention is depicted. The alternative design of FIG. 6 is the replaceability of the drill bit 26. The drill bit 26 inserts into a recess that is aligned with the orifice 54 of the first member 14. The position of the drill bit 26 is secured via a set screw 70 inserted into a threaded orifice 72 in a planar wall 38 of the locking member 28. The threaded orifice 72 intersects the recess that receives the drill bit 26. The set screw 70 is tightened until it engages a stem or shank portion 73 of the drill bit 26. Should the drill bit 26 become dulled or otherwise not effective, or should an alternative bit 26 be required, the inserted drill bit 26 is easily replaced by loosening the set screw 70.

Figure 7:
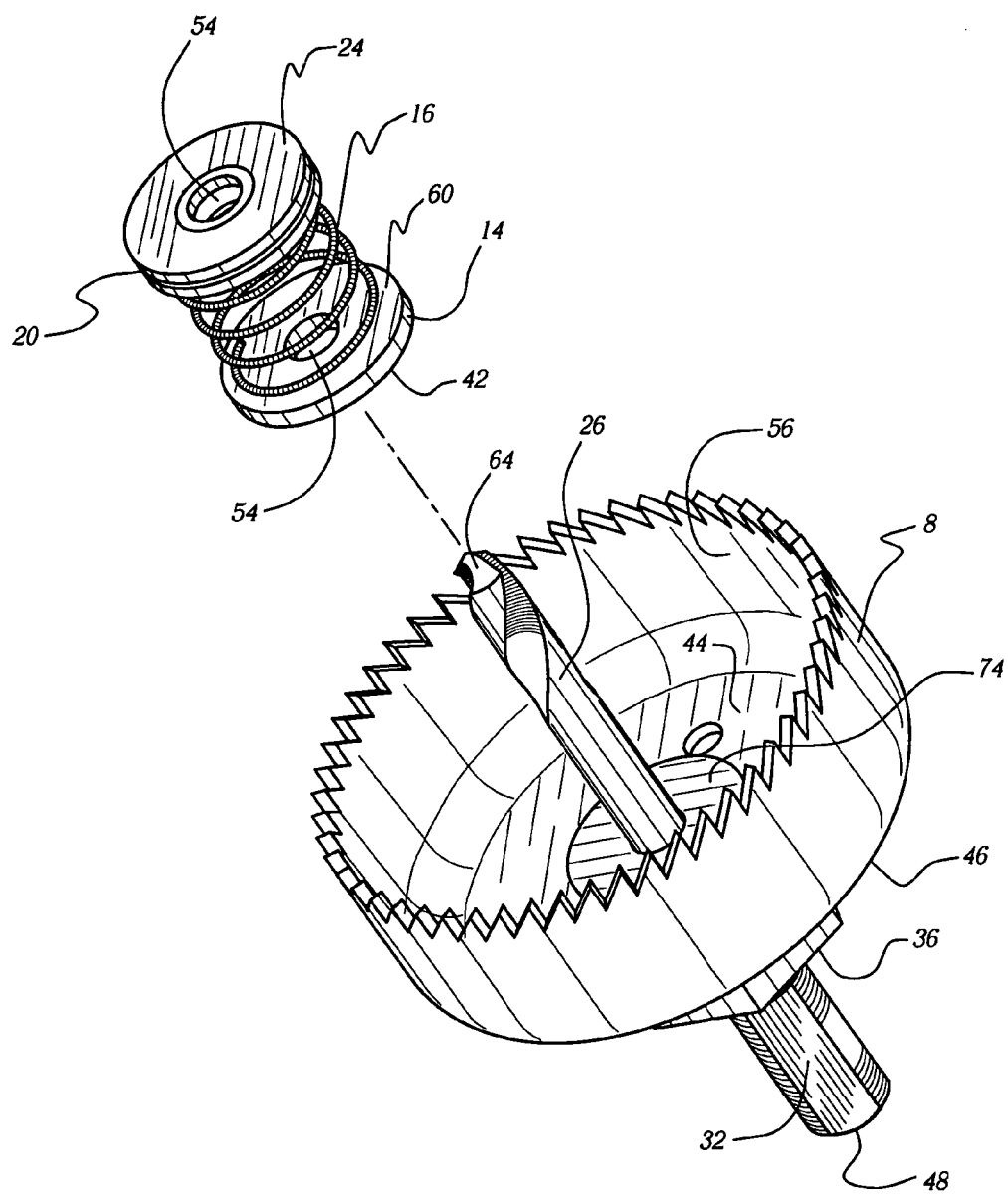
FIG. 7 is an exploded perspective view of another alternative design for the device of FIG. 1 in accordance with the present invention.

Referring now to FIG. 7, an exploded perspective view of another alternative design for the device of FIG. 1 in accordance with the present invention is depicted. The alternative design of FIG. 7 includes the uncoupling of the first member 14 from the locking member 28, and the integral joining of a washer 74 to the inner wall 44 of the hole saw 8. The alternative design of FIG. 7 allows the integrally joined biasing spring 16 and securing members 14 and 20, to "ride" upon the washer 74 via the outer wall 42 of the first member 14. This design permits the spring 16 and securing members 14 and 20 to be quickly replaced when a fatigued spring 16 or an alternative spring 16 is required. Further, the design transfers friction from the second member 20 depicted in FIG. 1 to both the first and second members 14 and 20 depicted in FIG. 7 thereby increasing the longevity of all components.

Figure 8:
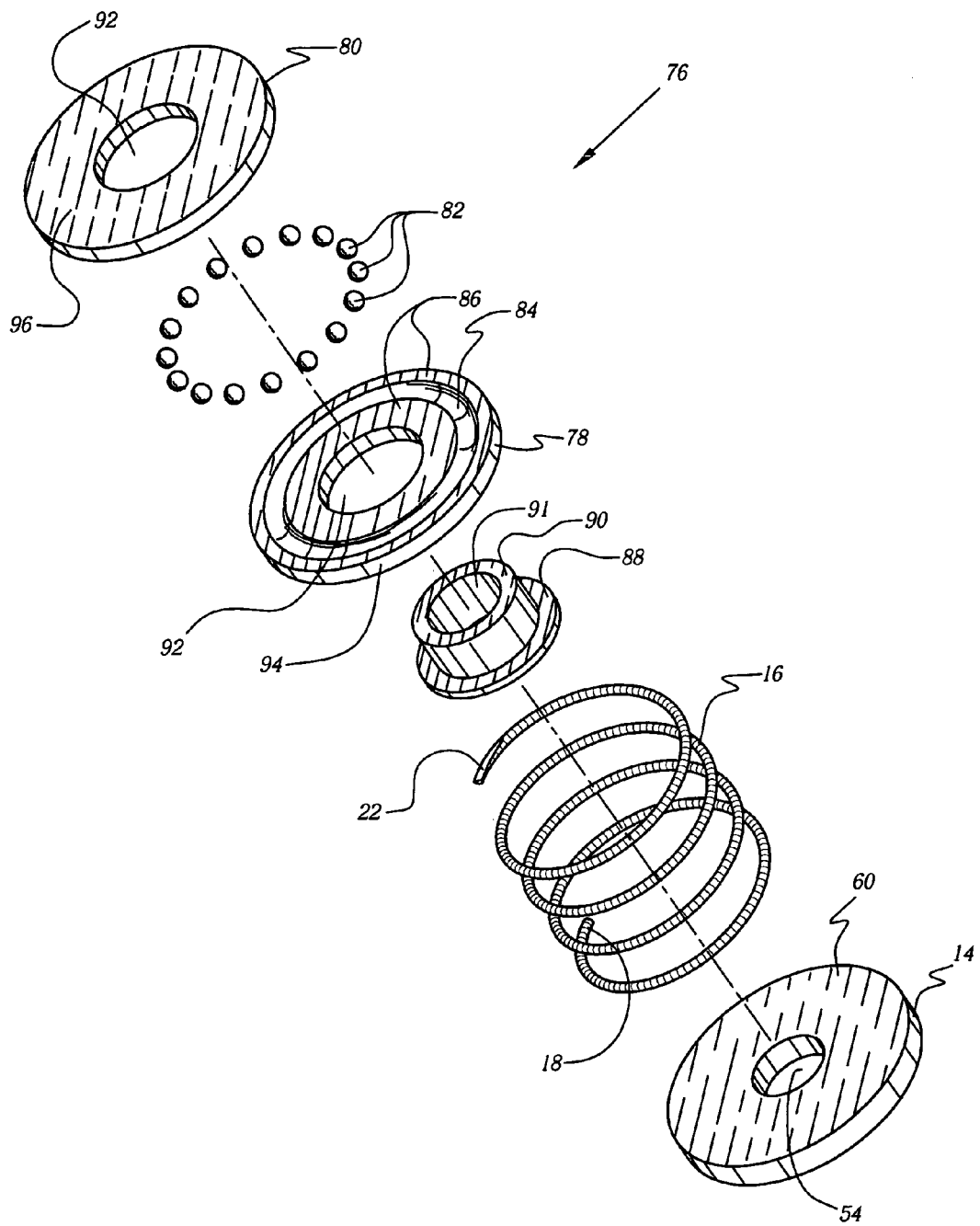
FIG. 8 is an exploded perspective view of still another alternative design for the device of FIG. 1 in accordance with the present invention.

Referring now to FIG. 8, an exploded perspective view of another alternative design for the device of FIG. 1 in accordance with the present invention is depicted. The alternative design of FIG. 8 replaces the second securing member 20 with a bearing assembly 76 that includes an inner raceway 78, an outer raceway 80 and a plurality of frictionless ball bearings 82 sandwiched therebetween in annular channels 84 such that inner planar walls 86 of the raceways 78 and 80 remain separated. The raceways 78 and 80 are cooperatively held together via a securing member 88 that includes a hub portion 90 which is forcibly inserted through apertures 92 in the raceways 78 and 80 thereby capturing the raceways and the bearings 82 therein. The hub portion 90 includes and orifice 91 that facilitates the insertion of the drill bit 26 through the bearing assembly 76, spring 16, first securing member 14 and into the locking member 28.

The raceways 78 and 80 are permanently sealed with greased bearings 82 therein to negate the systematic lubrication of the bearings 82. Instead of utilizing sealed bearings, a standard bearing configuration with a grease zerk for routine lubrication may be used. The first end 18 of the spring 16 is integrally joined to the inner wall 60 of the first securing member 14. The second end 22 of the spring 16 is integrally joined to an outer wall 94 of the inner raceway 78. In operation, an outer wall 96 of the outer raceway 80 engages the surface of a workpiece. Upon energizing a rotary drive tool, the device 10 rotates except for the outer raceway 80 which maintains its position relative the workpiece thereby preventing friction and heat generation between the device and the workpiece.

Figure 9:
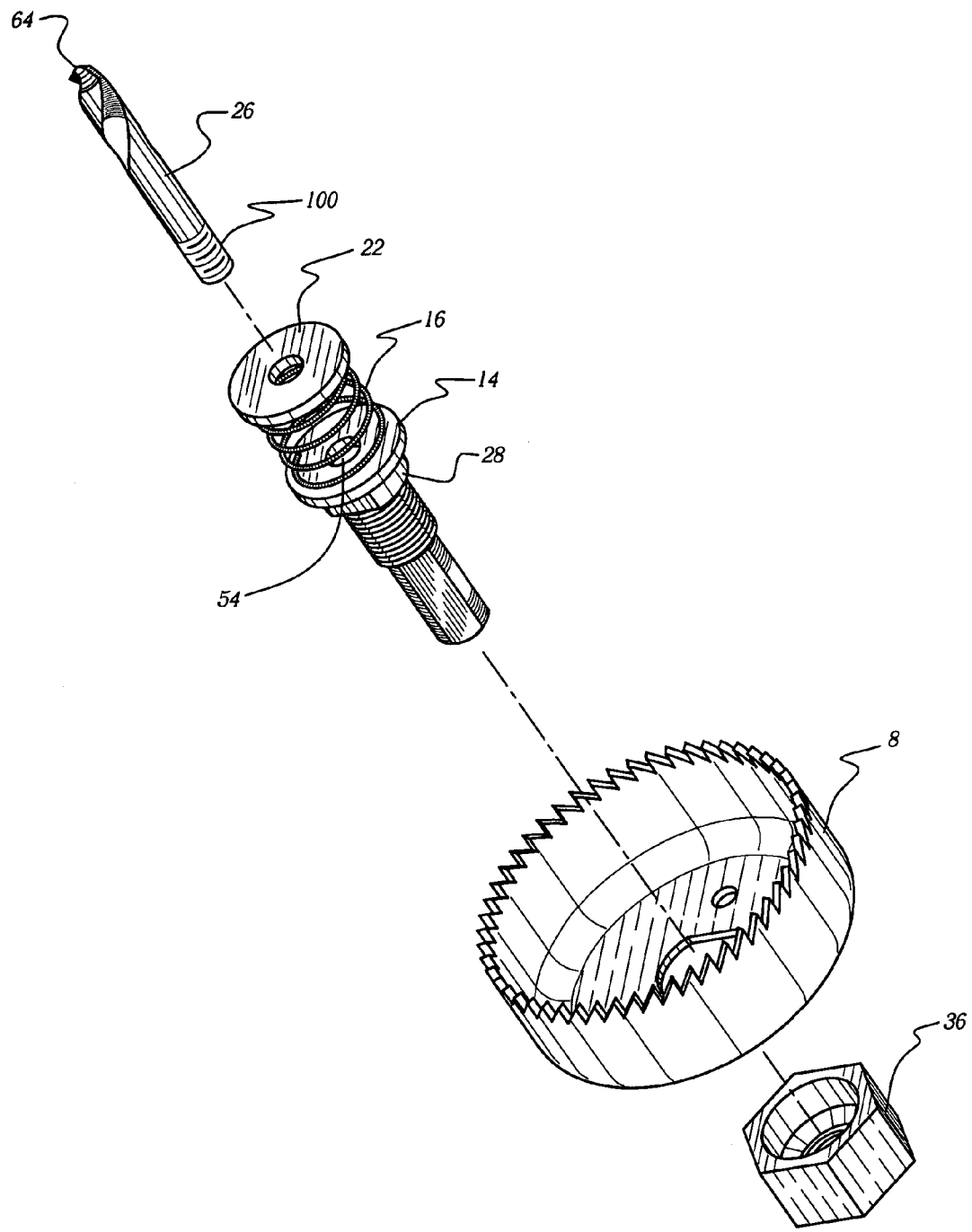
FIG. 9 is an exploded perspective view of a modification of the alternative design of FIG. 6.

Referring now to FIG. 9, an exploded perspective view of an alternative design for the device of FIG. 6 in accordance with the present invention is depicted. The alternative design of FIG. 9 uses a drill bit 26 with a threaded stem or shank portion 100 that is screwed into a cooperatively threaded receiving recess (not pictured) in the locking member 28. The receiving recess is axially aligned and cooperatively configured with the central aperture 54 in the first securing member 14 to promote the snug insertion of the shank portion 100 into the receiving recess. The design of FIG. 9 deletes the set screw 70 of FIG. 6 thereby reducing the number of components required to secure the drill bit 26 to the locking member 28.

Figure 10:
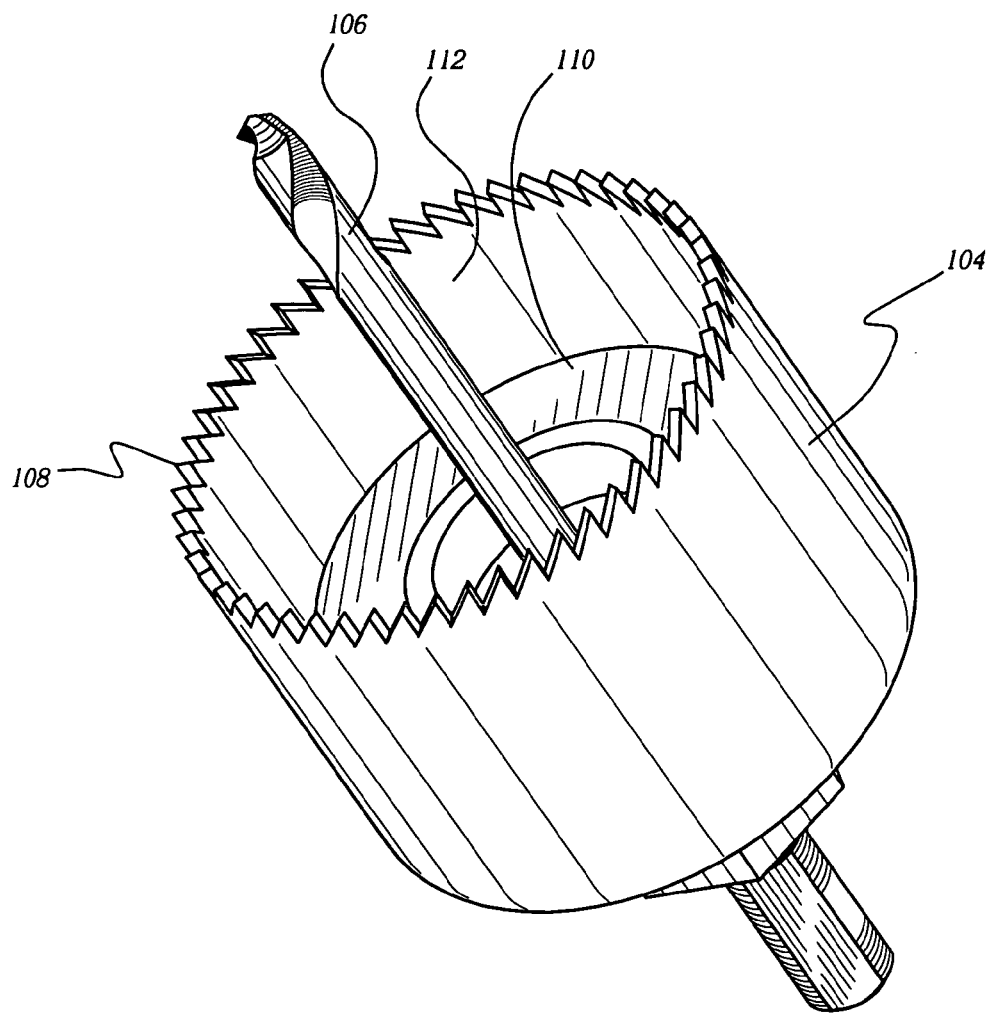
FIG. 10 is a perspective view of a hole saw with a drill bit protruding therefrom, the hole saw having a relatively large longitudinal axis to encase the device in accordance with the present invention.

Referring now to FIG. 10, a perspective view of a hole saw 104 with a drill bit 106 protruding therefrom is depicted in accordance with the present invention. The hole saw 104 (now part of the invention) includes a slightly tapered configuration and relatively longer axial dimension than the hole saw 8 above. The tapered configuration provides a cutting edge 108 that is relatively smaller in diameter than the bottom wall 110 of the saw 104. The longer axial dimension results in more of the severed portion 66 being contained inside the hole saw 104 after the spring 16 of the device 10 has expanded to a non-biased position. A larger portion of the severed portion 66 being contained inside the saw 104, "assists" the drill bit 106 in retaining the severed workpiece portion 66 upon the bit 106 as the hole saw 104 is removed from the workpiece thereby preventing the severed portion 66 from falling from the bit 106 and obstructing the newly cut hole. The tapered configuration promotes the quick manual removal of the severed preselected portion 66 from the hole saw 104 by decreasing the surface area of engagement between a conically configured inner wall 112 of the hole saw 104 and the cylindrically configured outer wall of the severed portion 66.

Figure 11:
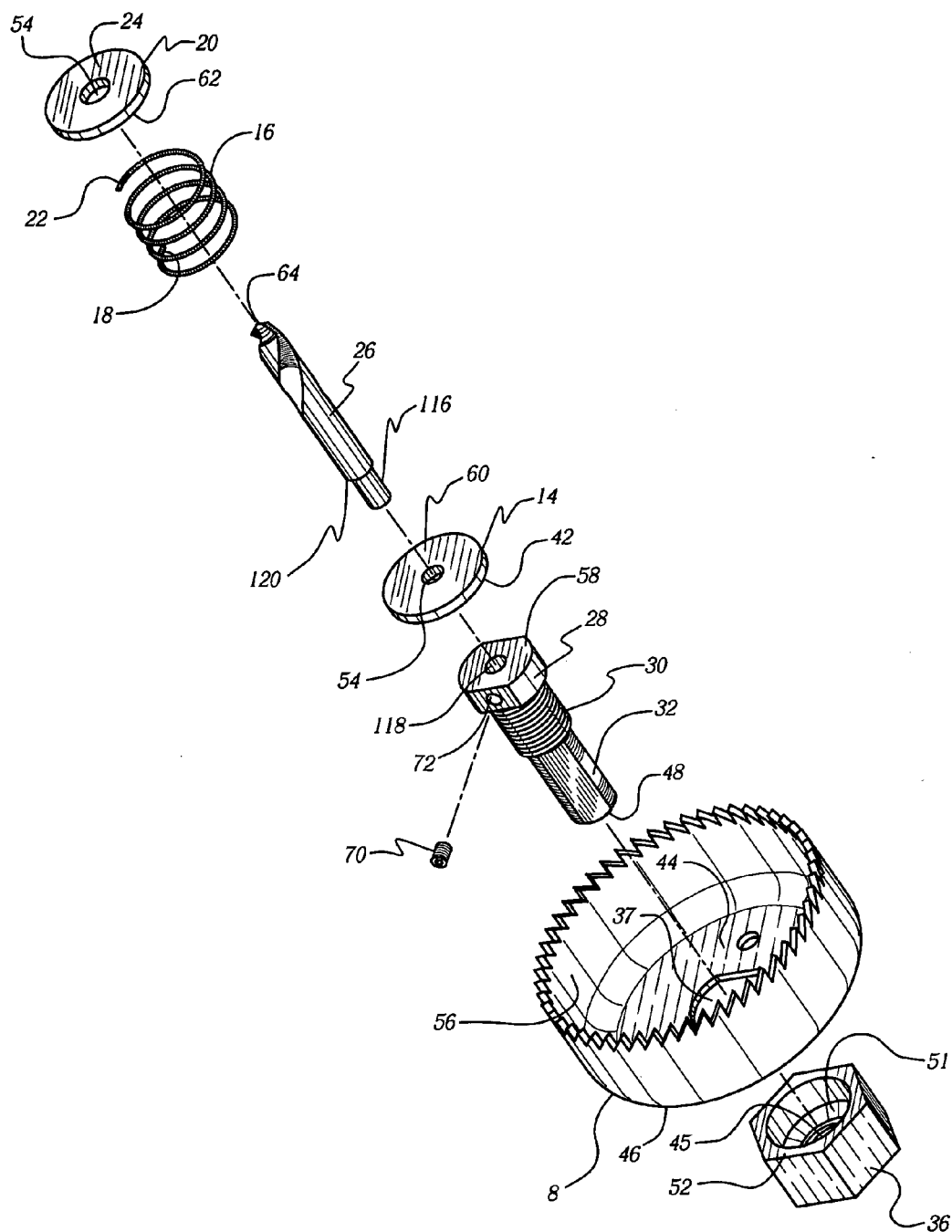
FIG. 11 is an exploded perspective view of a modification of the device of FIG. 6 in accordance with the present invention.

Referring now to FIG. 11, an exploded perspective view of a modification of the device of FIG. 6 in accordance with the present invention is depicted. The device of FIG. 11 includes a drill bit 26 having an insertion end portion 116 with a reduced diameter that allows the insertion end 116 to snugly insert through the central orifice 54 of the first securing member 14. The insertion end portion 116 is axially dimensioned to extend through the first securing member 14 and into the locking member 28 via recess 118 such that the set screw 70 captures the end portion 116. The drill bit is disposed to rotatably capture the first securing member 14 between a rim wall 120, formed by the reduced end portion 116, and the outer wall 58 of the locking member 28. The second securing member 20 is integrally joined to the spring 16, and the spring is integrally joined to the rotatable securing member 14 thereby forming a "spool" that can be rotated upon the drill bit 26 while being maintained at a predetermined position.

In operation, the drill bit 26 penetrates a workpiece and disposes the outer wall 24 of the second securing member 20 against a workpiece, the hole saw 8 starts to cut the workpiece and the spring 16 begins to compress. The force generated by the spring 16 coupled with the coefficient of friction between the outer wall 24 of the second securing member 20 and the workpiece, prevents the spool from rotating thereby transferring friction and wear between the stationary outer wall 42 of the first member 14 and the rotating outer wall 58 of the locking member 28. No friction would occur between the rim wall 120 of the bit 26 and the inner wall 60 of the first securing member 14 due to a slight separation between the walls 120 and 60 resulting from the compressed spring 16. The damage that would ordinarily result from the friction generated between the outer walls 42 and 58 is negated with the application of oil, grease or similar lubricant to the insertion end 116 of the bit 26, and the inner and outer walls 60 and 42 of the first securing member 14.

While the invention has been described with reference to the details of the embodiment, these details are not intended to limit the scope of the invention as defined in the appended claims.

What is claimed is:

1. A workpiece removal device for a hole saw comprising:
a positioning member joined to the hole saw;
a first securing member integrally joined to said positioning member, said positioning member includes a drill bit having a reduced insertion end with a rim wall for substantially maintaining the position of said first securing member relative to an outer wall of a locking member;
a biasing member having a first end integrally joined to said first securing member;
a second securing member integrally joined to a second end of said biasing member; and means for disposing said second securing member in communication with a workpiece whereby a preselected portion of the workpiece is ultimately severed from the workpiece by the hole saw, whereupon, said biasing member forcibly removes the severed preselected portion of the workpiece from the hole saw.

2. The device of claim 1 wherein said positioning member comprises a drill bit is integrally joined to said locking member having via a threaded end portion, said threaded end portion being integrally joined to a shank portion that is removably secured to a rotary motion tool.

3. The device of claim 2 wherein said locking member includes a configuration that promotes the snug insertion of said locking member through an aperture in the hole saw whereby the position of said positioning member is secured relative to the hole saw upon the threaded joining of a locking nut to said threaded end portion of said locking member.

4. The device of claim 3 wherein said locking nut is configured to promote the threaded joining of said locking nut with said threaded end portion of said locking member such that an inner end of said locking nut forcibly engages an outer planar wall of the hole saw thereby rigidly securing said positioning member to the hole saw.

5. The device of claim 1 wherein said first securing member includes a washer having a central aperture that snugly receives a cooperating portion of said positioning member therethrough.

6. The device of claim 1 wherein said biasing member includes a spring.

7. The device of claim 1 wherein said second securing member includes a washer having a central aperture that snugly receives a cooperating portion of said positioning member therethrough.

8. The device of claim 1 wherein said means for disposing includes inserting said positioning member through said biasing member and said second securing member such that said second securing member engages the preselected portion of the workpiece subsequent to the positioning member engaging the preselected portion.

9. The device of claim 1 wherein said means for disposing includes inserting said positioning member through said biasing member and said second securing member such that said second securing member engages the preselected portion of the workpiece prior to a cutting portion of the hole saw engaging the preselected portion.

10. The device of claim 1 wherein said means for disposing includes axially aligning said first and second securing members and said biasing means with said positioning member.

11. The device of claim 1 wherein said means for disposing includes positioning said second securing member such that an outer wall of said second securing member is disposed perpendicularly to a longitudinal axis of said positioning member.

12. The device of claim 1 wherein said first securing member slidably engages said positioning member.

13. The device of claim 1 wherein said second securing member slidably engages said positioning member.

14. The device of claim 1 wherein said biasing means is compressed when the hole saw engages the workpiece.

15. The device of claim 1 wherein said biasing means expands when the hole saw is separated from the workpiece.

16. The device of claim 1 wherein said biasing means generates sufficient expansion force to urge a severed portion of the workpiece from the hole saw.

17. The device of claim 1 wherein said first securing member is integrally joined to said drill bit.

18. The device of claim 17 wherein said drill bit is removably secured to said locking member.

19. The device of claim 1 wherein said biasing means is removably secured to said first securing member.

20. The device of claim 1 wherein said first securing member slidably engages said drill bit.

21. The device of claim 1 wherein said second securing member slidably engages said drill bit.

22. A device for removing a severed portion of a workpiece from a hole saw comprising:
a positioning member joined to the hole saw, said positioning member includes a drill bit that is removably secured to a locking member, said drill bit includes a reduced insertion end with a rim wall for substantially maintaining the position of a first securing member relative to an outer wall of said locking member;
a biasing member having a first end joined to first securing member, said biasing member having a second end joined to a second securing member; and
means for engaging said second securing member with a workpiece whereby a preselected portion of the workpiece is severed from the workpiece by the hole saw, whereupon, said biasing means forcibly removes the severed preselected portion of the workpiece from the hole saw.

23. The device of claim 22 wherein said drill bit includes a threaded insertion end.

24. A hole saw device for a workpiece comprising:
a tapered hole saw;
a first securing member disposed adjacent to a bottom wall of said tapered hole saw;
a drill bit having reduced insertion end that includes a rim wall for substantially maintaining the position of said first securing member relative to an outer wall of a locking member;
a biasing member having a first end secured to said first securing member;
a second securing member secured to a second end of said biasing member; and
means for engaging said second securing member with a workpiece whereby a preselected portion of the workpiece is ultimately severed and removed from the workpiece by said tapered hole saw, whereupon, said biasing means forcibly removes a portion of the severed preselected portion of the workpiece from the hole saw to promote the manual removal of the severed preselected portion from the tapered hole saw.

25. The device of claim 23 wherein said threaded insertion end is retained in said locking member via a threaded recess.

26. The device of claim 22 wherein said reduced insertion end is retained in said locking member via a set screw.

27. The device of 24 wherein said tapered hole saw includes an axial dimension that promotes the containment of the severed portion inside said hole saw to retain the severed portion upon said drill bit as said hole saw is removed from the workpiece thereby preventing the severed portion from falling from the drill bit and obstructing the newly cut hole.

28. The device of claim 22 wherein said first and second ends of said biasing member remain unattached to said respective first and second securing members.

29. The device of claim 22 wherein said second end of said biasing member is joined to a bearing assembly.

30. The device of claim 22 wherein said first securing member is unattached to said locking member.

31. The device of claim 22 wherein said second securing member is unattached to said biasing member.

32. The device of claim 22 wherein said first securing member is secured to said locking member.

33. The device of claim 22 wherein said drill bit is secured to said locking member via a set screw.

* * * * *

UNITED STATES PATENT AND TRADEMARK OFFICE
CERTIFICATE OF CORRECTION

PATENT NO. : 7,001,116 B2  Page 1 of 1
DATED : February 21, 2006
INVENTOR(S) : Kozak, Burton It is certified that error appears in the above-identified patent and that said Letters Patent is hereby corrected as shown below:

<u>Column 9,</u>
Line 15, replace "bole" with -- hole --.

<u>Column 10,</u>
Line 22, after "to" insert -- said --.
Line 37, after "having" insert -- a --.

Signed and Sealed this

Thirteenth Day of June, 2006

JON W. DUDAS
*Director of the United States Patent and Trademark Office*